United States Patent

Wu

Patent Number: 6,151,644
Date of Patent: Nov. 21, 2000

[54] DYNAMICALLY CONFIGURABLE BUFFER FOR A COMPUTER NETWORK

[75] Inventor: Chun-Chu Archie Wu, San Carlos, Calif.

[73] Assignee: I-Cube, Inc., Campbell, Calif.

[21] Appl. No.: 09/062,446

[22] Filed: Apr. 17, 1998

[51] Int. Cl.[7] .................................................. G06F 13/00
[52] U.S. Cl. ........................... 710/52; 710/213; 710/232; 370/229
[58] Field of Search ..................... 709/234–236, 709/285; 711/119, 229–235; 370/434; 710/52–57

[56] References Cited

U.S. PATENT DOCUMENTS

| | | | |
|---|---|---|---|
| 5,303,347 | 4/1994 | Gayne et al. | 711/119 |
| 5,757,771 | 5/1998 | Li et al. | 370/235 |
| 5,826,041 | 10/1998 | Ogus | 709/234 |
| 5,917,828 | 6/1999 | Thompson | 370/474 |
| 5,999,980 | 12/1999 | Tanaka et al. | 709/235 |

*Primary Examiner*—Christopher B. Shin
*Attorney, Agent, or Firm*—Daniel J. Bedell; Smith-Hill and Bedell

[57] ABSTRACT

A dynamically configurable network buffer includes a buffer manager organizing a buffer memory into a set of uniform sized packet buffers, each of which is large enough to store the largest possible data packet that may be transmitted through the network switch. The buffer manager further subdivides each packet buffer into a set of smaller packet cells of uniform size. When an incoming data packet arrives at the network buffer, the buffer manager determines its size. If the packet is too large to be stored in a single packet cell, the buffer manager stores the packet by itself in an unoccupied packet buffer. If the packet is small enough to be stored in a single packet cell, the buffer manager stores the packet in an unoccupied packet cell. The network buffer can increase or decrease packet cell size in response to input configuration data.

9 Claims, 9 Drawing Sheets

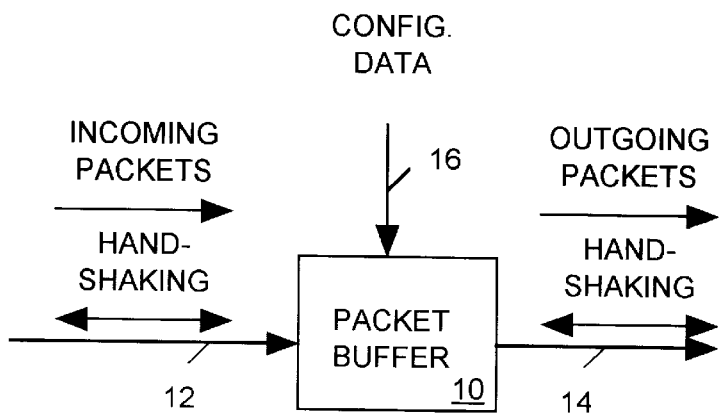
FIG. 1
| C7 | C6 | C5 | C4 | C3 | C2 | C1 | C0 |
|----|----|----|----|----|----|----|----|
| C15| C14| C13| C12| C11| C10| C9 | C8 |
| C23| C22| C21| C20| C19| C18| C17| C16|
| C31| C30| C29| C28| C27| C26| C25| C24|
FIG. 3A
| C0 |
|----|
| C1 |
| C2 |
| C3 |
FIG. 3D
| C3  | C2  | C1  | C0  |
|-----|-----|-----|-----|
| C7  | C6  | C5  | C4  |
| C11 | C10 | C9  | C8  |
| C15 | C14 | C13 | C12 |
FIG. 3B
| C0 |
|----|
| C1 |
FIG. 3E
| C1 | C0 |
|----|----|
| C3 | C2 |
| C5 | C4 |
| C7 | C6 |
FIG. 3C
| C0 |
|----|
FIG. 3F
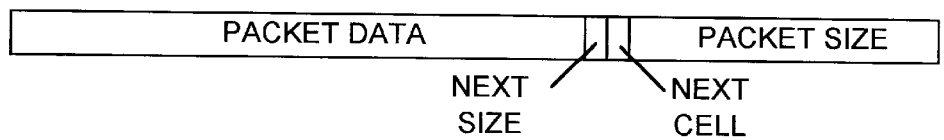
FIG. 3G

DYNAMICALLY CONFIGURABLE BUFFER FOR A COMPUTER NETWORK

BACKGROUND OF THE INVENTION

1. Field of the Invention

The present invention relates in general computer networks and in particular to a dynamically configurable buffer for a computer network.

2. Description of Related Art

When computers communicate through an Ethernet or similar network they send packets of data to one other. Packets travel buses, and the various buses forming an Ethernet network can have varying data transfer rates. A network buffer is a device that receives and stores packets arriving on one bus and then forwards them outward on another bus. A buffer can be used in an Ethernet network, for example, to link a high-speed bus to a low-speed bus because the buffer can receive and store packets arriving at a high rate on the high-speed bus and then forward them on the low speed bus at a slower rate. A network buffer can also be used as an input stage to a packet routing device to store packets until the routing device is ready to forward them to its network destination.

A typical network buffer includes a random access buffer memory for storing packets and a buffer manager for writing packets arriving on an input bus into the buffer memory and for reading packets out of the memory and forwarding them on an output bus. In an Ethernet or similar network, data packets may range in size between specified minimum and maximum sizes. Thus a buffer manager must be able to keep track of the size of each packet stored in the buffer memory, where each packet is stored, and the order in which stored packets arrived. Prior art buffer managers have used various methods for organizing a buffer memory and for keeping track of the packets it stores. Simple buffer managers carry out relatively few record keeping steps but typically do not use buffer memory efficiently. Some buffer managers use buffer memory efficiently but at the cost of carrying out more complicated record keeping operations. Since buffer memory cost increases with its size, it is desirable to make efficient use of buffer memory. On the other hand, since complicated record keeping procedures increase the complexity of the buffer manager and the amount of time the buffer manager needs to process incoming packets, it is desirable to keep the buffer manager's record keeping operations relatively simple.

A prior art "maximum packet size" buffer manager divides buffer memory into uniform sized packet buffers, each of which is large enough to handle the largest permissible packet size. Each packet buffer stores only one packet regardless of packet size. A maximum packet size buffer manager may employ relatively record keeping logic but does not make efficient use of buffer memory when most packets are much smaller than the largest possible size; much of the storage capacity of each packet buffer is often unused.

A "minimum packet size" buffer manager divides buffer memory into several uniform sized packet buffers, each of which is generally much smaller than the maximum allowable packet size, suitably only as large as the minimum allowable size packet. Since more than one packet buffer is usually needed to store a packet, the buffer manager splits an incoming packet into appropriately sized segments (i.e. it "disassembles" the packet) and stores the segments in as many available packet buffers as are needed. The buffer manager must maintain an ordered list of the packet buffers containing the segments of each packet so that it can properly reassemble the packet when it is time to forward it via an output bus. A minimum packet size buffer manager normally makes much more efficient use of buffer memory capacity than a maximum packet size buffer manager but is more complex because it has to carry out the disassembly and reassembly operations on each packet and because it must maintain a relatively more complicated record of packet storage locations. Also, since a minimum packet size buffer manager must carry out more complicated operations when receiving and forwarding a packet, a minimum packet size buffer manager may have a slower throughput than a network switch employing a maximum packet size buffer manager.

What is needed is a relatively simple buffer manager that provides for efficient use of buffer memory but which does not require substantial processing overhead.

SUMMARY OF THE INVENTION

A dynamically configurable buffer for a computer network includes a packet buffer manager and a buffer memory. The packet buffer manager receives an incoming data packet on an input bus, organizes it into a sequence of data words and stores the data word sequence in a contiguous set of storage locations in the buffer memory. The buffer manager later reads the data packet out of the buffer memory and forwards it via an output bus.

In accordance with one aspect of the present invention, the buffer manager organizes the packet memory into a set of uniform-sized packet buffers. Each packet buffer is sufficiently large to store the maximum size packet that may be transmitted over the network. The buffer manager subdivides each packet buffer into a set of uniform-sized packet cells, each packet cell consisting of at least a sufficient number of storage locations to store a packet of the minimum size that may be transmitted over the network.

In accordance with another aspect of the invention, when the buffer manager receives an incoming small packet (a packet that is no larger than size of a packet cell), the buffer manager stores the packet in a single packet cell. When the buffer manager receives several small packets in succession, it stores the packets in successive packet cells. However upon receiving an incoming large packet (a packet that is larger than can be stored in a single packet cell), the buffer manager stores the packet in an unoccupied packet buffer. Thus each packet buffer may either store one and only one large packet or a sequence of one or more small packets, with the small packets being stored in successive packet cells.

In accordance with another aspect of the invention, the packet cell size may be adjusted by input data in order to improve efficiency of buffer memory use. When few packets are larger than minimum size, packet cell size can be set to the minimum size to allow a maximum number of packets to be stored in each packet buffer. When many packets are larger than the minimum size packet, packet cell size can be increased accordingly order to accommodate larger packets.

It is accordingly an object of the invention to provide a buffer management system for network packet buffer that makes relatively efficient use of buffer memory but does not require extensive processing overhead.

The concluding portion of this specification particularly points out and distinctly claims the subject matter of the present invention. However those skilled in the art will best understand both the organization and method of operation of the invention, together with further advantages and objects thereof, by reading the remaining portions of the specification in view of the accompanying drawing(s) wherein like reference characters refer to like elements.

BRIEF DESCRIPTION OF THE DRAWING(S)

FIG. 1 illustrates in block diagram form a dynamically configurable network packet buffer in accordance with the present invention.

FIGS. 3A–3F are diagrams illustrating alternative organizations of the packet buffer memory of FIG. 2;

FIG. 3G illustrates the formal of a packet cell;

DESCRIPTION OF THE PREFERRED EMBODIMENT(S)

FIG. 1 illustrates a dynamically configurable buffer 10 in accordance with the present invention for a computer network. Packet buffer 10 receives and stores data packets arriving sequentially on a network bus 12 and then forwards them outward on another network bus 14 in the order received. Packet buffer 10 is useful, for example, when packets arrive in bursts on bus 12 at a higher rate than they can be carried away by bus 14. As discussed in detail below, externally generated configuration data CONFIG supplied to buffer 10 via a control bus 16 controls the manner in which buffer 10 stores data in its internal buffer memory.

Figure 2:
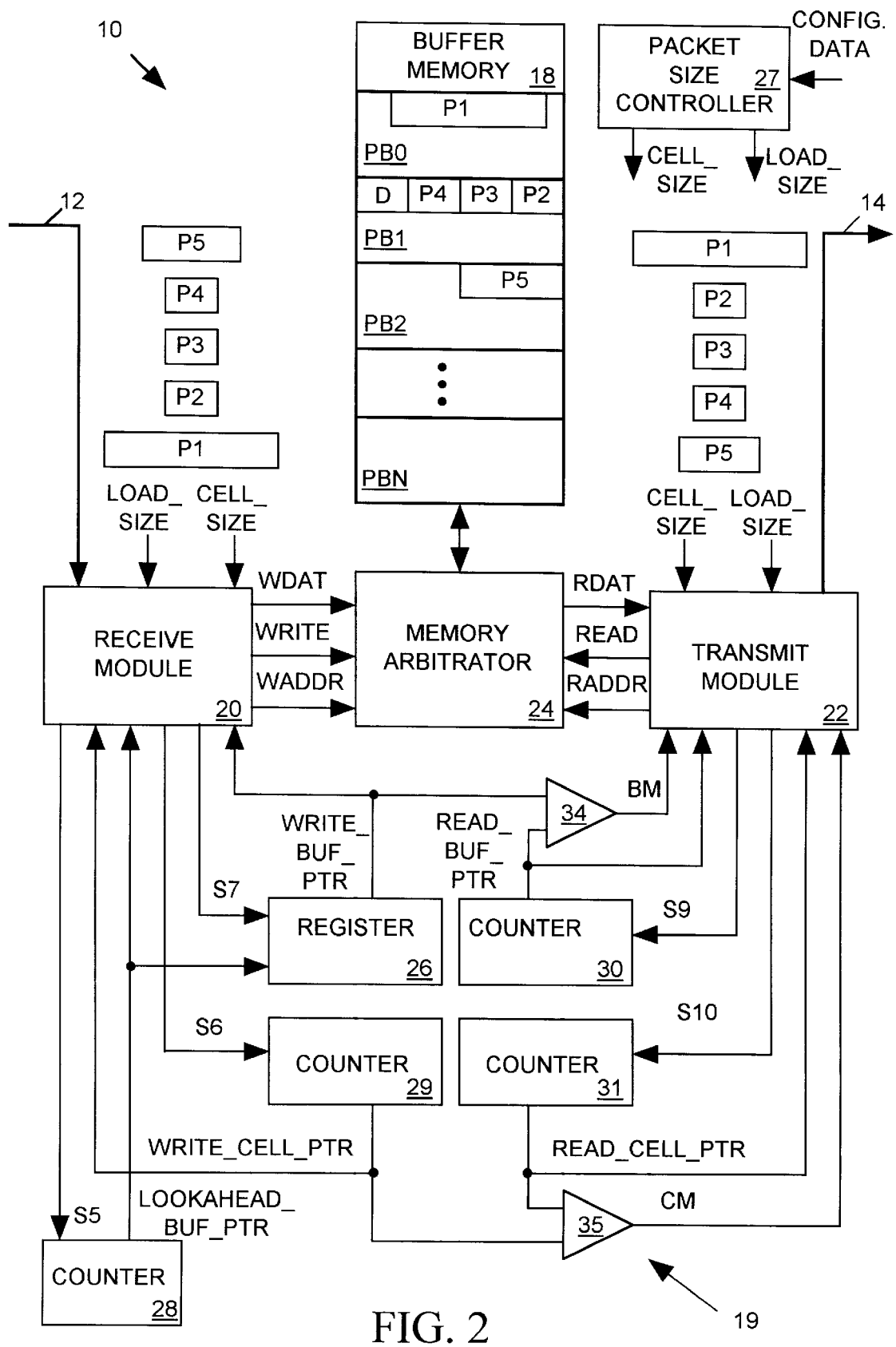
FIG. 2 illustrates the packet buffer of FIG. 1 in more detailed block diagram form.

FIG. 2 illustrates buffer 10 of FIG. 2 in more detailed block diagram form. The present invention relates in particular to the manner in which buffer 10 manages an internal buffer memory 18 storing data packets arriving on a network input bus 12 until they can be forwarded via a network output bus 14. Packets arriving on bus 12 may be of variable size. In this example it is assumed, for simplicity, that a data packet may range in size between 31 and 1023 16-bit words. Buffer memory 18, which suitably stores a 16-bit word at each address, is organized into a set of N+1 packet buffers PB0–PBN, each capable of storing 1024 16-bit words. As illustrated in FIGS. 3A–3F, each packet buffer PB0–PBN is further subdivided into M packet cells each containing 1024/M 16-bit words. The number M of packet cells into which each packet buffer PB0–PBN may be subdivided is determined by the externally generated input data CONFIG. In this example M can have any value of the set {32,16,8,4,2 and 1}. FIG. 3A illustrates the organization of a single packet buffer into M=32 packet cells C0–C31. FIGS. 3B–3F illustrate the organization of a single packet buffer when M=16, 8, 4, 2 and 1, respectively.

With M=32, as illustrated in FIG. 3A, each packet cell C0–C31 is capable of storing 32 16-bit words, or one word more than the smallest allowable size packet that can be transmitted on the network. Each packet buffer PB1–PBN is large enough (1024 16-bit words) to store one maximum size packet (1023 16-bit words) along with one extra 16-bit word.

Packet buffer 10 includes, in addition to buffer memory 18, a buffer manager 19 comprising a receive module 20, a transmit module 22, a memory arbitrator 24, a packet size controller 27, and various counters and registers used to keep track of packets stored in buffer memory 18. Receive module 20 receives incoming data packets arriving on bus 12, converts each packet into a sequence of 16-bit words, and writes each word into buffer memory 18 via a conventional memory arbitrator 24. Receive module 20 supplies each word to memory arbitrator 24 as a 16-bit data value WDAT and also supplies a memory write address WADDR to memory arbitrator 24 and a write control signal WRITE to memory arbitrator 24. Memory arbitrator 24 responds to the WRITE signal by writing the packet data word WDAT into buffer 18 at the indicated address WADDR.

After the receive module 20 writes a data packet into buffer memory 18, transmit module 22 reads each packet data out of buffer memory 18 via memory arbitrator 24 forwards it outward from buffer 10 via bus 14. Transmit module 22 reads a packet data word out of buffer memory 18 by supplying a read address RADDR and a READ signal pulse to memory arbitrator 24. Arbitrator 24 responds to the READ signal pulse by returning to transmit module 22 the packet data word RDAT addressed by RADDR.

Packet size controller 27 receives the externally generated CONFIG information indicating cells size and forwards it as input data CELL_SIZE to receive module 20 and transmit module 22. Packet size controller 27 transmits a LOAD_SIZE signal pulse to receive module 20 and to transmit module 22 to tell them when new CELL_SIZE data is available.

FIG. 2 illustrates an example wherein receive module 20 receives a sequence of packets P1–P5 arriving on bus 12 after system start up. The packet cell size is initially 32 16-bit words so that each packet buffer PB0–PBN is organized into 32 packet cells C0–C31 as illustrated in FIG. 3A. Receive module 20 stores the five packets P1–P5 in buffer memory 18 as they arrive. When receive module 20 receives a "large" packet (a packet that is larger than can be stored in a single packet cell C0–C31), it reserves the next "unoccupied" packet buffer PB0–PBN for the packet even though the arriving packet may not require all of the storage capability of the reserved packet buffer. A packet buffer or a packet cell is unoccupied if it is not currently storing an unforwarded data packet. Thus, since the first packet P1 is large, receive module 20 stores packet P1 by itself in the first three cells C0–C2 of the packet buffer PB0. The remaining cells C4–C31 of packet buffer PB0 are unused.

After storing large packet P1 in packet buffer PB0, receive module 20 stores the next packet (P2) in the first cell C0 of the next unoccupied packet buffer PB1. Receive module 20 considers a packet to be "small" if it is small enough to be stored in a single packet cell C0–C31. Packets P2–P4 are all small, packets P1 and P5 are large. When receive module 20 receives up to 32 small packets in succession, it writes the packets to successive cells C0–C31 of the same packet buffer. Therefore, since three successive packets P2–P4 are all small, receive module 20 writes them successively into cells C0–C2, respectively, of packet buffer PB1. Since the last packet P5 is large, receive module 20 stores P5 by itself in the first two cells C0 and C1 of buffer PB2. Cells C2–C31 of buffer PB2 are unused. The next packet arriving after P5 will be written into packet buffer PB3 starting with its first cell C0.

Receive module 20 will continue to write incoming packets arriving after packet PB5 to the remaining packet buffers PB2–PBN in a similar manner until all packet buffers PB0–PBN have received either a single large packet or a sequence of one or more small packets. When all packet buffers PB0–PBN have received packets, receive module 20 writes newly arriving packet(s) starting again with packet buffer PB0 on the assumption that transmit module 22 has already read out and forwarded any packet previously written to packet buffer PB0. The number N+1 of packet buffers PB0–PBN should therefore be made sufficiently large to handle any expected packet backlog in order to avoid overwriting packet data that has not been forwarded.

Transmit module 22 reads packets out of buffer memory 18 in the order they were stored therein and forwards them outward on bus 14. Receive and transmit modules 20 and 22 use a register 26, a set of counters 28–31 and a pair of comparators 34 and 35 to keep track of the packets stored in buffer memory 18. Register 26 stores a pointer (WRITE_BUF_PTR) to the particular packet buffer PB0–PBN to which an incoming packet is currently being written. Counter 28 produces an output count (LOOKAHEAD_BUF_PTR) identifying a next available packet buffer PB0–PBN. Counter 29 produces an output count (WRITE_CELL_PTR) pointing to a particular cell C0–C31 within the packet buffer identified by WRITE_BUF_PTR to which an incoming packet is currently being written. Counters 30 and 31 produce output counts (READ_BUF_PTR) and (READ_CELL_PTR) pointing to a particular packet cell C0–C31 within a particular packet buffer from which the packet data is currently being read out of buffer memory 18.

Receive Module

On system start up, all pointers are initially set to 0 except LOOKAHEAD_BUF_PTR which is set to 1. When the first packet P1 begins to serially arrive on bus 12, receive module 20 assembles it into a sequence of 16-bit words. Whenever it has assembled a 16-bit packet data word, receive module 20 signals memory arbitrator 24 to write the word into buffer memory 18. Since WRITE_BUF_PTR and WRITE_CELL_PTR are both 0, receive module 20 begins writing successive 16-bit words of packet P1 into sequential addresses of cell C0 of packet buffer PB0 starting with the second storage location of C0. FIG. 3G illustrates the formal of the fist packet cell of a packet buffer. As discussed below, the first storage location of the starting cell of a packet is reserved for header data that receive module 20 generates. The remaining cells of a packet buffer store 32 bytes of packet data and no header information. After writing 31 words into cell C0, receive module 20 pulses one of a set of control lines S6 to increment the WRITE_CELL_PTR output of counter 29 so that it now refers to cell C1 of buffer PB0. Receive module 20 then begins to write incoming data words packet P1 to cell C1 of packet buffer PB0. As packet P1 continues to arrive, receive module 20 writes packet data words into successive addresses of successive cells C0–C2 of packet buffer PB0 until receive module 20 determines it has stored the last word of packet P1 in buffer memory 18.

Receive module 20 maintains a count (PACKET_SIZE) of the number of 16-bit words forming packet P1, and after writing all of packet P1 into packet buffer PB0, receive module 20 writes the PACKET_SIZE data into the reserved first storage location of cell C0 of packet buffer PB0. Transmit module 22 later uses that PACKET_SIZE data to determine the length of the packet that it must read out and forward on bus 14. Receive module 20 also writes a "NEXT_CELL" bit and a "NEXT_SIZE" bit into the first storage location of cell C0. Receive module 20 sets the NEXT_CELL bit to a logical "1" to indicate that the next packet (P2) will be found starting at the first cell (C0) of the next packet buffer (PB1) rather than in cell C1 of PB0. As explained in detail below, receive module 20 sets the NEXT_SIZE bit to a "1" to indicate that it is altering packet cell size.

Since the next packet is to be written into packet buffer PB1, receive module 20 pulses a control line S7 causing write register 26 to load the LOOKAHEAD_BUF_PTR output of counter 28. Since LOOKAHEAD_BUF_PTR is initially 1, WRITE_BUF_PTR is incremented to 1 so that it now points to PB1. Receive module 20 then pulses one of control lines S6 to reset the output of counter 29 WRITE_CELL_PTR to 0 so that it points to cell C0. The WRITE_CELL_PTR and WRITE_BUF_PTR pointers tell receive module 20 to write the next arriving packet (P2) into cell C0 of packet buffer PB1. Receive module 20 also pulses a line of control input S5 to counter 28 thereby incrementing LOOKAHEAD_BUF_PTR to 2 so that it points to packet buffer PB2.

As packet P2 arrives via bus 12 receive module 20 writes it into packet buffer PB1 starting with the second storage location in cell C0. Packet P2 is small and fits within a single packet cell C0 of buffer PB1. After loading packet P2 into cell C0 of packet buffer PB1, receive module 20 writes its PACKET_SIZE data and a NEXT_CELL bit into the reserved first storage location of cell C0, packet buffer PB1. Receive module 20 sets the NEXT_CELL bit of that first storage location to a "0" to indicate that the next packet (P2) is to be written into the next cell (C1) of PB1. Receive module 20 then signals counter 29 to increment WRITE_CELL_PTR to 1. Thus WRITE_BUF_PTR and WRITE_CELL_PTR now together point to cell C1 of packet buffer PB1.

Receive module 20 should store the next incoming packet P3 in cell C1 of PB1 if it is small, but should store packet P3 in buffer PB2 if it is large. Since receive module 20 determines the length of each packet by counting the packet words as it stores them in buffer memory 18, receive module 20 does not initially know whether packet P3 is large or small. Since receive module 20 does not initially know whether to store packet P3 in cell C1 of PB1 or starting in cell C0 of PB2, it concurrently stores incoming words of packet P3 in both cells. If packet P3 turns out to be small, receive module 20 simply ignores the copy of P3 stored in PB2 and later writes incoming packet P5 over the copy of P3 as illustrated in FIG. 2. On the other hand, if packet P3 had been large, the portion of P3 stored in cell C1 of PB1 would be ignored and receive module 20 would write the remaining portion of P3 to successive cells of PB2.

After writing packet P3 into cell C1 of packet buffer PB1, receive module 20 writes the PACKET_SIZE, NEXT_CELL and NEXT_SIZE data into the reserved first memory location of that cell C1. The NEXT_CELL data bit is again set to a "0" to indicate that the next packet (P4) may be found in cell C2 of PB1 (and to cell C0 of PB2). Receive module 20 then increments counter 29, writes packet P4 to cell C2 of PB1, and then sets the NEXT_CELL bit at the start of cell C2 to a "0" to indicate the next packet P5 is to appear in cell C3 of PB1.

As packet P5 arrives, it is loaded concurrently into cell C3 of PB1 and into cell C0 of PB2. When receive module 20 detects that packet P5 is large, it sets the NEXT_CELL bit in cell C3 of PB1 to a "1" to indicate that packet P5 is to be found starting in cell C0 of PB2 instead of in the next cell C3 of PB1. It also sets the PACKET_SIZE data in cell C3 of PB1 to 0 to indicate that a "dummy packet" D of size 0 is stored in cell C3. Receive module 20 also loads LOOKAHEAD_BUF_PTR into register 26 and sets the WRITE_CELL_PTR output of counter 29 to 1 so that the next word of packet P5 is stored at the first location of cell C1 of PB2. After writing the remainder of packet P5 to cell C1, receive module 20 sets the NEXT_CELL bit in cell C0 of buffer PB2 to a 1 and stores the PACKET_SIZE data value in that buffer cells. Receive module 20 then resets WRITE_CELL_PTR to 0 and loads LOOKAHEAD_PTR into register 26 so that it will be ready to begin storing a next incoming packet in buffer PB3.

Figure 4:
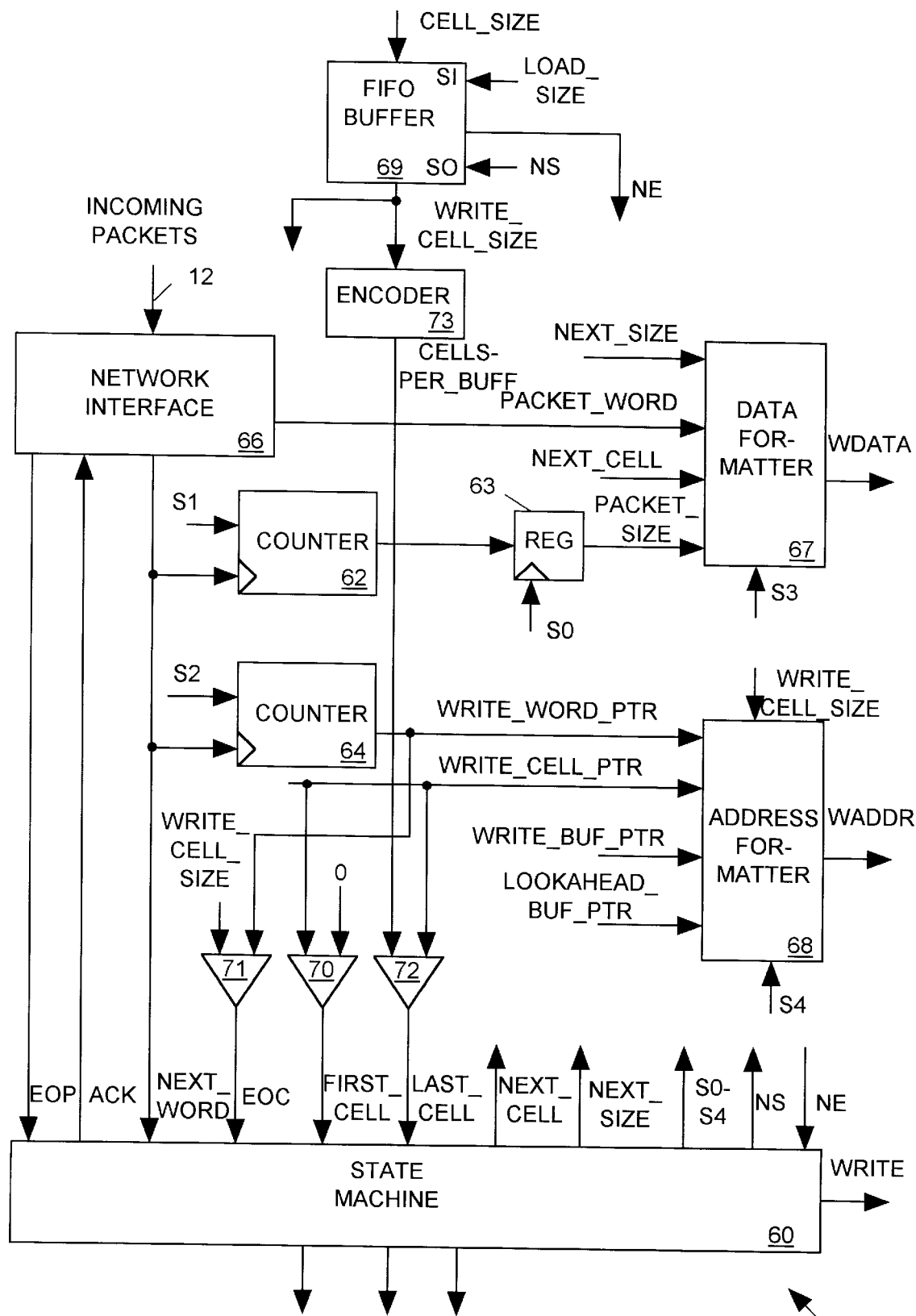
FIG. 4 illustrates the receive module of FIG. 2 in more detailed block diagram form.
Figure 5:
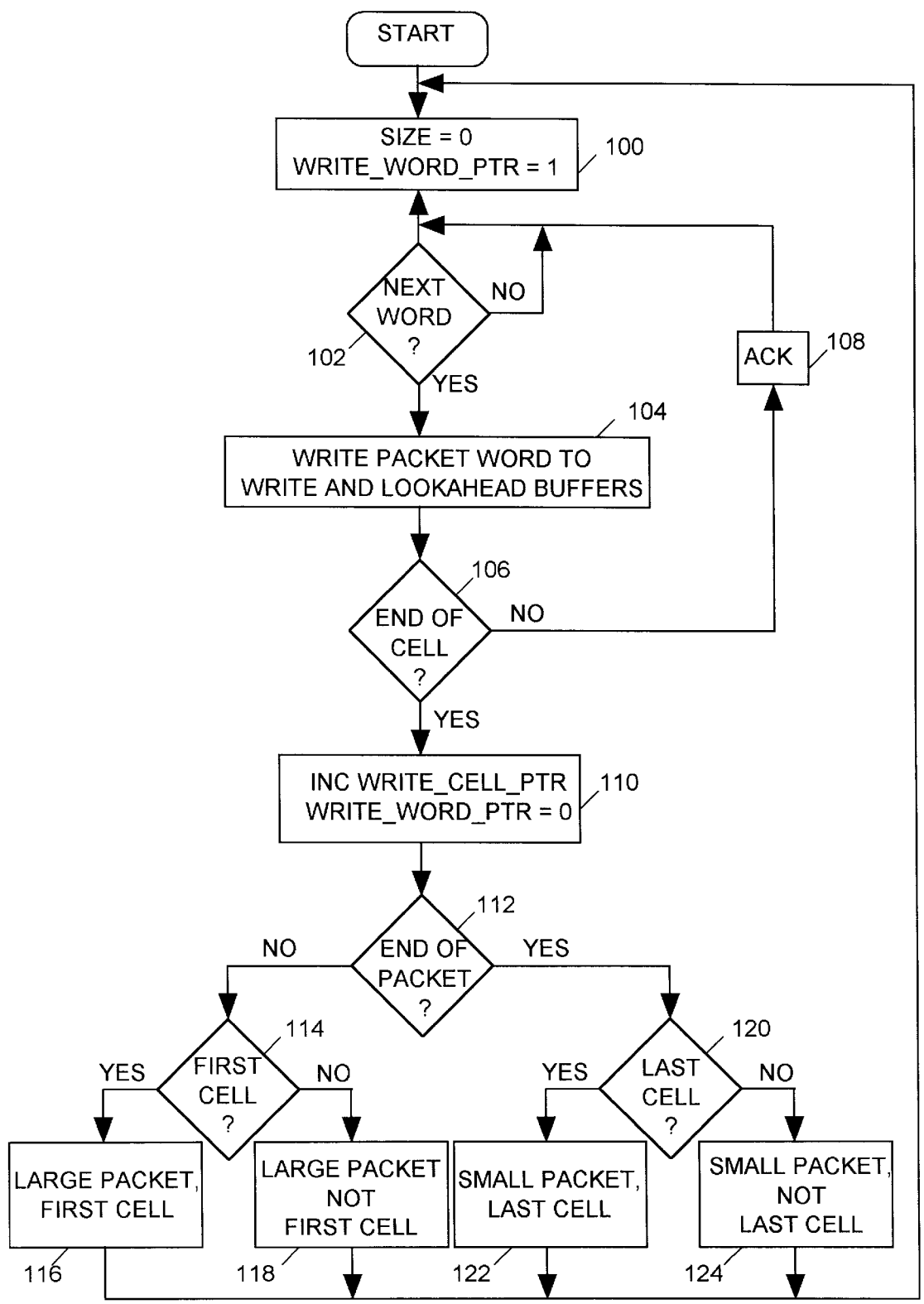
FIGS. 5–9 are flow charts illustrating operation of the state machine 60 of FIG. 4.

FIG. 4 illustrates receive module 20 of FIG. 2 in more detailed block diagram form. A state machine 60 acts as master controller for receive module 20. FIGS. 5–9 are flow charts illustrating operation of state machine 60. Referring to FIGS. 4 and 5, on system start up, state machine 60 assets an S1 signal to set the output of a counter 62 to 0 (step 100). Counter 62 counts the number of words in each incoming data packet to produce the PACKET_SIZE data for the packet. Also at step 100, following system start up, state machine 60 asserts an S2 signal to set the output of a counter 64 to 1. Counter 64 counts the number of words that have been written to a packet cell to generate a pointer (WRITE_WORD_PTR) to a particular storage address within a cell that is to receive the next packet word.

A conventional network interface circuit 66 receives an incoming packet on bus 12 in serial form and assembles it into an output sequence of 16-bit packet data words (PACKET_WORD). When a new PACKET_WORD appears at the output of network interface 66, network interface 66 pulses a NEXT_WORD signal incrementing counters 62 and 64 and signaling state machine 60 (step 102). State machine 60 responds to the NEXT_WORD signal (step 104) by causing the new PACKET_WORD to be written to the write buffer. The "write buffer" is the particular storage buffer memory location referenced by combination of pointers WRITE_WORD_PTR, WRITE_CELL_PTR, and WRITE_BUF_PTR. To write PACKET_WORD to the write buffer, state machine 60 first sets control signals S3 so that a data formatter 67 provides PACKET_WORD as write data input (WDAT) to buffer memory 18 of FIG. 2 and sets control signals S4 so that an address formatter 68 selects the WRITE_WORD_PTR, WRITE_CELL_PR and WRITE_BUF_PTR and produces therefrom a write address input (WADDR) to buffer memory 18. A first-in, first-out (FIFO) buffer 69 responds to a pulse of the LOAD_SIZE signal from packet size controller 27 of FIG. 2 by storing incoming CELL_SIZE data. The CELL_SIZE data value stored longest in FIFO buffer 69 is provided as WRITE_CELL_SIZE data input to address formatter 68. The WRITE_CELL_SIZE data tells address formatter 68 the current packet cell size. Address formatter 68 multiplies the write cell pointer (WRITE_CELL_PTR) by WRITE_CELL_SIZE and adds the result to WRITE_WORD_PTR to obtain the least significant bits of the write address WADDR. The write buffer pointer (WRITE_BUF_PTR) provides the most significant bits of the write address.

After signaling data and address formatters 67 and 68 to provide the appropriate write data WDAT and write address WADDR, state machine 60 asserts a WRITE signal input to memory arbitrator 24 of FIG. 2, thereby causing it to write the PACKET_WORD in the buffer memory 18 address referenced by WADDR. State machine 60 also writes the packet word to a "lookahead buffer" (at step 104) by signaling address formatter 68 to produce an address WADDR computed from its LOOKAHEAD_BUF_PTR and WRITE_WORD_PTR inputs and then re-asserting the WRITE signal.

A comparator 71 asserts an end of cell (EOC) signal when WRITE_WORD_PTR reaches the size of a packet cell indicated by the current WRITE_CELL_SIZE data output of FIFO buffer 69. If at step 106 comparator 71 is not asserting the end of cell (EOC) signal after state machine 60 writes the packet to the write and lookahead buffers at step 104, state machine 60 sends an acknowledge signal (ACK) to network interface 66 (step 108) and awaits another NEXT_WORD pulse (step 102). The ACK signal tells network interface 66 that it may provide a next PACKET_WORD output when available. State machine 60 continues to loop through steps 102, 104, 106 and 108 writing incoming packet data words to successive cell word locations of the first cell C0 of the first packet buffer PB0. When packet data has been stored in the last word location of cell C0 of PB0, comparator 71 sends an end of cell (EOC) signal to state machine 60 (step 106). State machine 60 responds at step 110 by sending an S6 signal to counter 29 of FIG. 2 to increment WRITE_CELL_PTR and by sending S2 signals to set WRITE_WORD_PTR to 0.

Network interface 66 asserts an "end of packet" indicating signal (EOP) when the current PACKET_WORD output contains the last bits of a data packet. If at step 112, state machine 60 does not detect the EOP signal, then it knows that the incoming packet is large. Conversely, if the EOP signal is asserted at step 112, then state machine 60 knows the incoming packet is small. In the example illustrated in FIG. 2 first packet P1 is large and network interface 66 does not assert the EOP signal interface 66 after cell C0 of packet buffer PB0 is filled. In that case decision block 112 directs state machine 60 to step 114 of FIG. 5 where state machine 60 determines whether a comparator 70 is asserting a FIRST_CELL signal. Comparator 70 compares WRITE_CELL_PTR to 0 to determine whether the currently active write buffer cell is the first cell (C0) of a packet buffer. In the example of FIG. 4, comparator 70 asserts the FIRST_CELL signal at step 114. This causes state machine 60 to execute a "LARGE PACKET, FIRST CELL" routine (step 116) illustrated in detail in FIG. 6.

Figure 6:
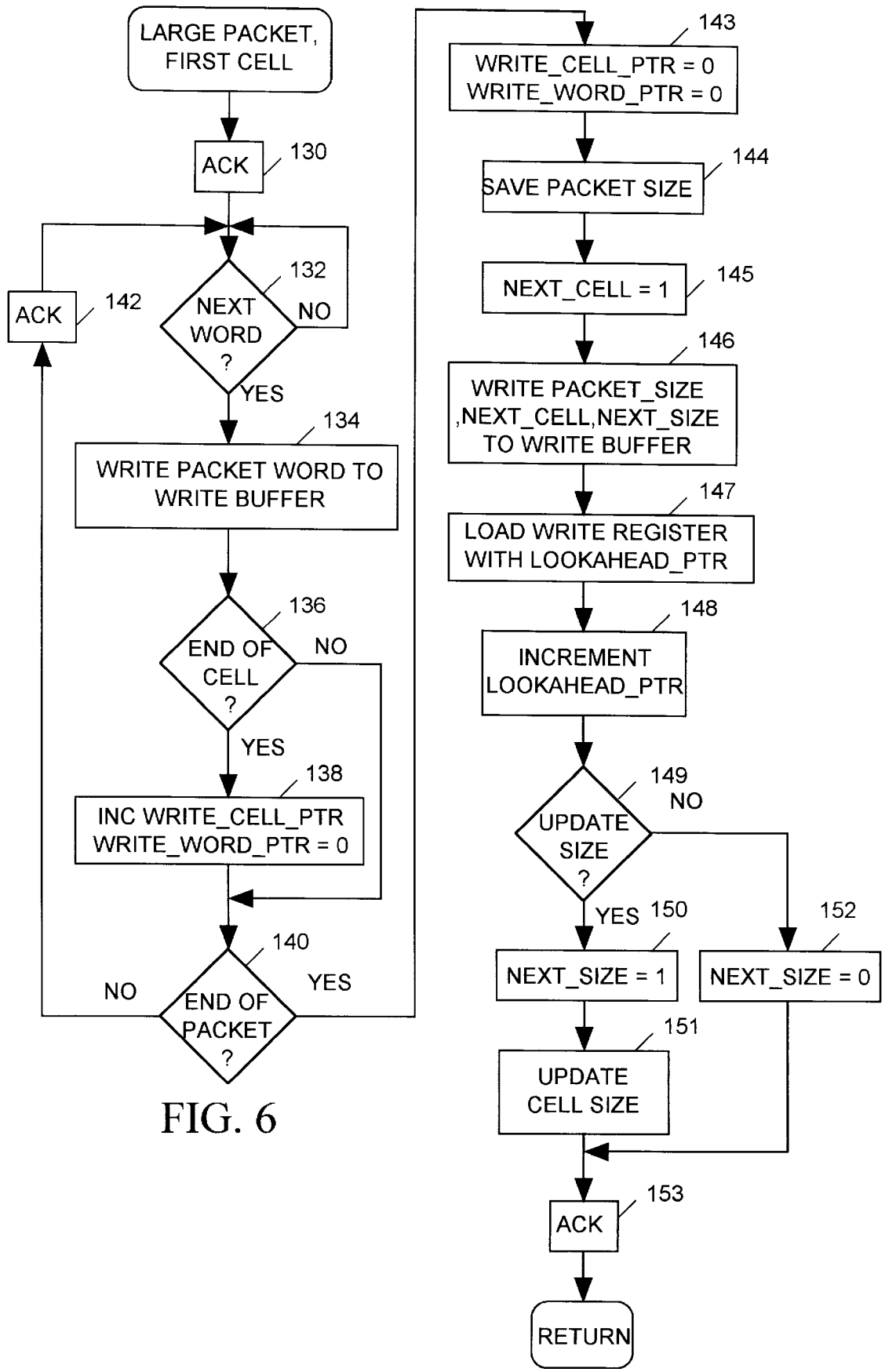

The LARGE PACKET, FIRST CELL routine of FIG. 6 handles the writing of the remaining portions of a large packet to a packet buffer when the first portion of the packet has already been stored in the first cell (C0) of the packet buffer. Referring to FIG. 6, state machine 60 sends an ACK signal to network interface 66 (step 130) to tell network interface 66 that it may provide the next PACKET_WORD of the incoming packet when available. State machine 60 then waits (step 132) until it receives a NEXT_WORD signal from network interface 66 indicating the next packet word is available. When network interface 66 has provided a next PACKET_WORD and has incremented counters 62 and 64, it asserts the NEXT_WORD signal. At that point state machine 60 writes the new PACKET_WORD to the write buffer (step 134) by configuring data formatter 67 to pass the PACKET_WORD as DATA input to the buffer memory, configuring address formatter 68 to pass WRITE_BUF_PTR, WRITE_CELL_PTR, and WRITE_WORD_PTR as address input ADDR to the buffer memory, and then asserting the WRITE signal.

State machine 60 then checks the end of cell (EOC) output of comparator 71 to determine whether the next cell (C1) of the write buffer has been filled (step 136). If it has, state machine 60 increments the WRITE_CELL_PTR output of counter 29 and resets the WRITE_WORD_PTR output of counter 64 to 0 (step 138). After step 138 (or after step 136 if the end of cell (EOC) signal is not asserted), state machine 60 checks the EOP output of network interface 66 to determine if the last bits of the incoming packet were included in the PACKET_WORD just stored (step 140). If not, state machine assets the ACK signal to tell network interface 66 that it may provide a new PACKET_WORD output (step 142) and then returns to step 132 to await that next PACKET_WORD. State machine 60 continues to loop through steps 132–142 storing successive PACKET DATA words in the write buffer until it encounters an end of packet (EOP) signal at step 140 indicting that the incoming packet is completely stored in the write buffer.

At that point (step 143) state machine 60 sets the WRITE_CELL_PTR output of counter 29 of FIG. 2 to 0, sets the WRITE_WORD_PTR output of counter 64 of FIG. 4 to 0, and sets its own NEXT_CELL bit output to a "1". State machine 60 then asserts an S0 signal to clock the PACKET_SIZE data of counter 62 into a register 63 (step 144), sets the next cell bit to a "1" (step 145), and then writes the PACKET_SIZE data in register 63 and output NEXT_CELL and NEXT_SIZE bits to the write buffer (step 146). State machine 60 carries out step 146 by first switching data formatter 67 so that it selects the PACKET_SIZE data output of register 63 and its own NEXT_CELL and NEXT_SIZE output bits as the DATA input to the buffer memory. State machine 60 then signals address formatter 68 to select the WRITE_BUF_PTR, WRITE_CELL_PTR and WRITE_WORD_PTR data as the ADDR input to the buffer memory and asserts the WRITE signal. This causes the PACKET_SIZE and NEXT_CELL data to be written to the first storage location of the first cell of the current write buffer. (This storage location was skipped when writing packet data into the write buffer and therefore does not contain any packet data). The NEXT_CELL bit is set to a logical "1" to indicate that the next packet (in this example packet P2) will be stored in cell C0 of buffer PB1 instead of in cell C1 of buffer PB0. As explained below, state machine 60 sets its NEXT_SIZE output bit to a "1" when the packet buffer has cells that are of a different size than the preceding packet buffer.

State machine 60 thereafter loads the LOOKAHEAD_BUF_PTR into register 26 of FIG. 2 (step 147), signals counter 28 of FIG. 2 to increment LOOKAHEAD_BUF_PTR (step 148). At that point state machine 60 checks a "not empty" (NE) output of FIFO buffer 69 (step 149). FIFO buffer 69 asserts its NE output when it is storing at least one incoming CELL_SIZE data value received after its current WRITE_CELL_SIZE data output. If the NE output of FIFO buffer 69 is asserted, state machine 60 sets NEXT_SIZE to a "1" (step 150) and pulses an output NS bit causing FIFO buffer to shift out the next received CELL_SIZE data as the new WRITE_CELL_SIZE data input to address formatter 68 and counter 64, thereby updating the packet cell size (step 151). If packet size is not to be updated, state machine 60 sets NEXT_SIZE to a "0" (step 152). After step 151, (or after step 152 if packet cell size is not to be updated), state machine 60 asserts the ACK signal (step 153) to tell network interface 66 that it is ready to process a next packet. The LARGE PACKET, FIRST CELL routine of FIG. 6 then ends and returns to step 100 of FIG. 5.

Referring again to FIG. 5, the first part of a large incoming packet may be initially written to other than the first cell (C0) of the write buffer if it follows a small packet. For example packet P5 of FIG. 2 followed three small packets P2–P4. Since receive module 20 of FIG. 2 did not initially know whether packet P5 was large or small, it wrote the first portion of P5 to cell C3 of buffer PB1 and also to the first cell (C0) of the lookahead buffer PB2. Upon determining at steps 112 and 114 that packet P5 was large and that P5 was being loaded into other than the first cell of the write buffer, state machine 60 (at step 118) executes a LARGE PACKET, NOT FIRST CELL routine illustrated in FIG. 7.

Figure 7:
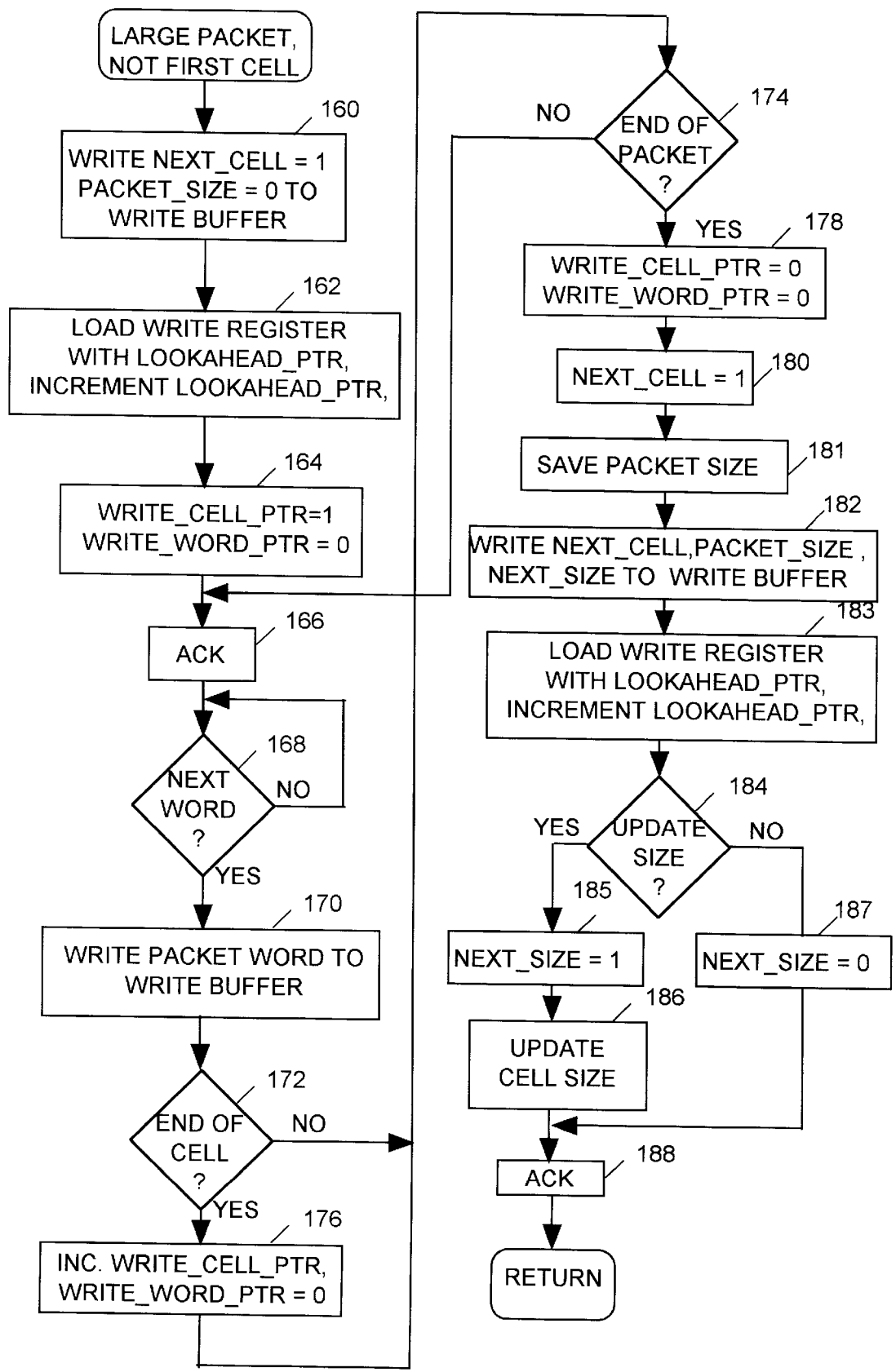

Referring to FIG. 7, state machine 60 sets its output NEXT_CELL bit equal to 1 and then the writes the NEXT_CELL bit and PACKET_SIZE=0 data into the first location of the write buffer cell (step 160). In the example of FIG. 2, state machine 60 writes the PACKET_SIZE data and the NEXT_CELL bit into the first address of cell C3 of packet buffer PB1. That NEXT_CELL bit, having a value of 1, indicates that the next packet (P5) will be found beginning in cell C0 of packet buffer PB2. State machine 60 then loads LOOKAHEAD_BUF_PTR into register 26 to make the next packet buffer the write buffer and signals counter 28 to increment LOOKAHEAD_BUF_PTR (step 162). State machine 60 thereafter sets the WRITE_CELL_PTR output of counter 29 to 1 and sets the WRITE_WORD_PTR output of counter 64 to 0 (step 162). Thus the lookahead buffer is made the current write buffer and the next packet data word will be stored in the first storage location of cell C1 of the PB1. At that point state machine 60 sends an ACK signal to network interface 66 (step 166) waits for a NEXT_WORD signal from interface 66 (step 168), and thereafter writes the new PACKET_WORD to the write buffer (step 170). If at this point comparator 71 is not asserting the end of cell (EOC) signal (step 172) and network interface 66 is not asserting the end of packet (EOP) signal (step 172), state machine 60 reverts to step 166 where it asserts the ACK signal, and then waits for the next packet word (step 168).

State machine 60 continues to loop through steps 166, 168, 170, 172 and 174 writing packet data to the write buffer until at step 172 it detects an end of cell (EOC) signal indicating that cell C1 of the write buffer is full. State machine 60 then signals counter 29 of FIG. 2 to increment the WRITE_CELL_PRT so that it points to cell C2, and signals counter 64 of FIG. 4 to reset the WRITE_WORD_PTR to 0 (step 176). This ensures that the next arriving packet data word will be written to the first storage location of the next cell (C2). The process continues to loop through steps 166–176 filling successive cells of the write buffer until at step 174 network interface 66 signals end of packet. At that point (step 178) state machine 60 tells counter 29 to set WRITE_CELL_PTR to 0 tells counter 64 to set WRITE_WORD_PTR to 0 (step 178), sets its NEXT_CELL output bit to a "1" (step 180) and pulses the NS bit to update packet size (step 181). State machine 60 then clocks the PACKET_SIZE data into register 63 and writes the NEXT_CELL, PACKET_SIZE and NEXT_SIZE data into the first storage location of cell C0 of the write buffer (step 182). State machine 60 then loads LOOKAHEAD_BUF_PTR into register 26 to make the next packet buffer the write buffer and signals counter 28 to increment LOOKAHEAD_BUF_PTR (step 183). Thereafter state machine 60 checks the NE output of FIFO buffer 69 (step 184) and if the NE signal is asserted, state machine 60 sets NEXT_SIZE=1 (step 185) and pulses its output NS bit to causing FIFO buffer 69 to shift out new CELL_SIZE data, thereby updating the packet cell size (step 186). If size is not to be updated, state machine 60 sets the NEXT_SIZE bit to a "0" (step 187). After step 186 or 187, state machine 60 asserts the ACK signal (step 188) to tell network interface 66 that it is ready to process a next incoming packet and returns to step 100 of FIG. 5 to process the next incoming packet.

When state machine 60 later writes the next incoming packet to the next packet buffer, it sets the NEXT_SIZE bit that it stores with that packet to a logical "1" when packet cell size has changed starting with that packet buffer. At all other times its sets the NEXT_SIZE bit to a logical "0". As described below, whenever transmit module 22 of FIG. 2 begins reading packet data out of a next packet buffer PB0–PBN, it checks the NEXT_SIZE bit stored with the first packet in the buffer to determine whether the packet cell sizing has changed.

Referring again to FIG. 5, when a small packet has been written to a buffer memory cell, state machine 60 of FIG. 4 will detect an EOP (end of packet) signal from network interface 66 at step 112. State machine 60 then checks the LAST_CELL signal output of a comparator 72 of FIG. 4 to determine whether WRITE_CELL_PTR equals the current number of cells per packet buffer (step 120). An encoder 73 covers the WRITE_CELL_SIZE output of FIFO buffer 69 into CELLS_PER_BUFF data indicating the current number of cells per packet buffer and supplies the CELLS_PER_BUFF data to comparator 72. The LAST_CELL signal indicates that the last arriving packet was stored in the last cell of a packet buffer. In such case state machine 60 executes a SMALL PACKET, LAST CELL routine of FIG. 8.

Figures 8, 9:
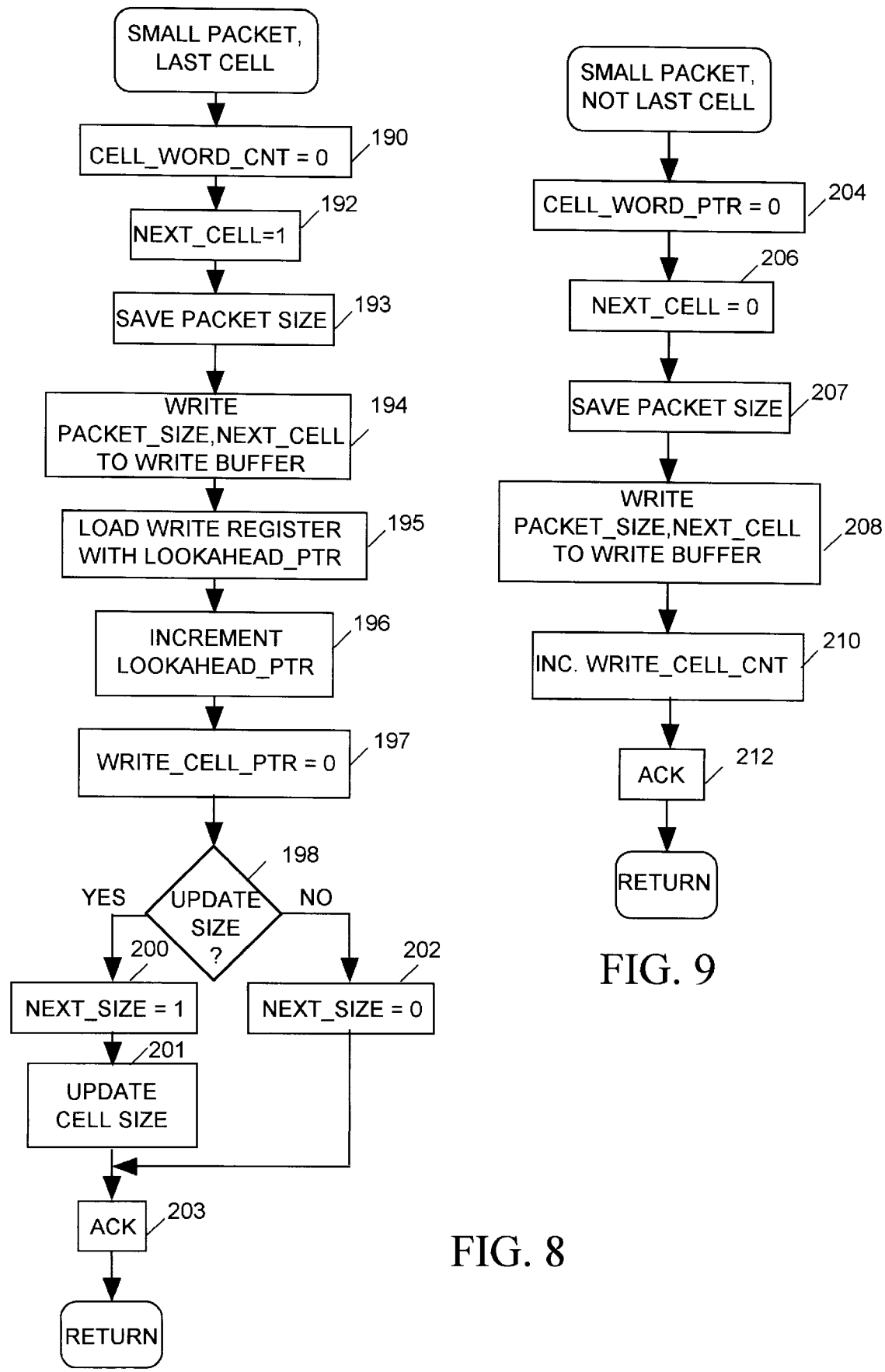

Referring to FIG. 8, state machine 60 sets WRITE_WORD_PTR=0 (step 190), sets NEXT_CELL=1 (step 192), clocks the PACKET_SIZE data into register 63 (step 193) and writes PACKET_SIZE and NEXT_CELL to the first word location of the last cell of the write buffer (step 194). State machine 60 then loads LOOKAHEAD_BUF_PTR into register 26 to make the next packet buffer the write buffer (step 195), signals counter 28 to increment LOOKAHEAD_BUF_PTR (step 196) and sets WRITE_CELL_PTR=0 (step 197). State machine 60 then checks the NE output of FIFO buffer 69 (step 198) and if the NE signal is asserted, state machine 60 sets NEXT_SIZE to "1" (step 200) and pulses its output NS bit to causing FIFO buffer 69 to shift out new CELL_SIZE data, thereby updating the packet cell size (step 201). If the NE signal is not asserted, state machine 60 sets NEXT_SIZE to "0" (step 202). After step 200 or 202 state machine 60 sends the ACK signal to network interface 66 (step 203), and then returns to step 100 of FIG. 5 to prepare to process the next incoming packet.

When at step 120 of FIG. 5, state machine 60 detects that the last incoming small packet was not stored in the last cell of a packet buffer, it executes a SMALL PACKET, NOT LAST CELL routine illustrated in FIG. 9. Referring to FIG. 9, state machine 60 sets WRITE_WORD_PTR=0 (step 204), sets NEXT_CELL=0 (step 206), and clocks the PACKET_SIZE data into register 63 (step 207) and writes PACKET_SIZE and NEXT_CELL to the first word location of the current cell of the write buffer (step 208). State machine 60 the increments WRITE_CELL_PTR (step 210), sends the ACK signal to network interface 66 (step 212), and then returns to step 100 of FIG. 5 to prepare to process the next incoming packet. Note that state machine 60 does not update cell size at this point since it may not be finished writing packets to the current packet buffer.

Transmit Module

Figure 10:
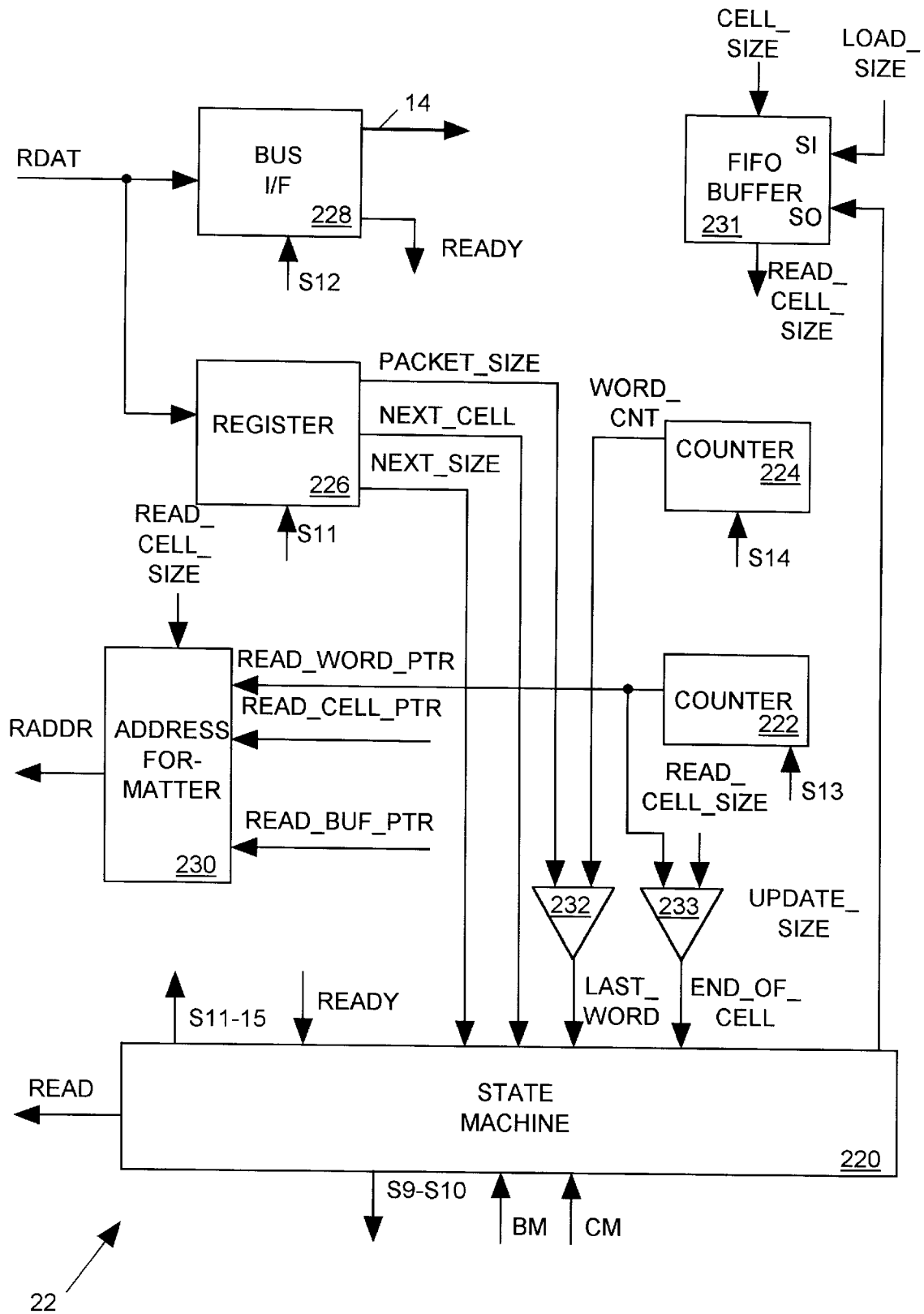
FIG. 10 illustrates the transmit module of FIG. 2 in more detailed block diagram form.

FIG. 10 illustrates transmit module 22 of FIG. 2 in more detailed block diagram form. Transmit module 22 reads packets out of buffer memory 18 of FIG. 2 and forwards outward via bus 14. Transmit module 22 includes a state machine 220 for controlling module operation, a counter 222 for producing a pointer (READ_WORD_PTR) to the current cell word being accessed, and a counter 224 for counting the total number of words (WORD_CNT) of a packet that have been read out of the buffer memory and forwarded. A register 226 stores the PACKET_SIZE, NEXT_SIZE and NEXT_CELL data for the packet currently being forwarded. A bus interface circuit 228 receives and serializes packet data words read out of buffer memory 18 and then forwards the packet data via bus 14. Switch interface circuit 228 carries out bus 14 handshaking protocol (if any) and signals state machine 220 with a READY signal when it is ready to receive a next packet data word. An address formatter 230 receives pointers READ_WORD_PTR, READ_CELL_PTR and READ_BUF_PTR from counters 222, 31 (FIG. 2) and 30 (FIG. 2), respectively, and computes therefrom a read address RADDR supplied to memory arbitrator 24 of FIG. 2. A FIFO buffer 231 shifts in the CELL_SIZE data from packet size controller 27 (FIG.2) in response to a LOAD_SIZE signal pulse applied to its shift-in control input (SI) and shifts out the longest stored CELL_SIZE data as a READ_CELL_SIZE data value applied as input to comparator 233 and address formatter 230. A comparator 233 transmits an END_OF_CELL signal to state machine 220 whenever a packet data word is being read out of the last address of a packet cell. Address formatter 230 multiplies the READ_CELL_PTR pointer by READ_CELL_SIZE and adds the result to the READ_WORD_PTR to obtain the least significant bits of the read address RADDR. The READ_BUF_PTR pointer provides the most significant bits of the read address. A comparator 232 compares the WORD_CNT output of counter 224 to the PACKET_SIZE data stored in register 226 and asserts a LAST_WORD signal input to state machine 220 when its two values match.

Figure 11:
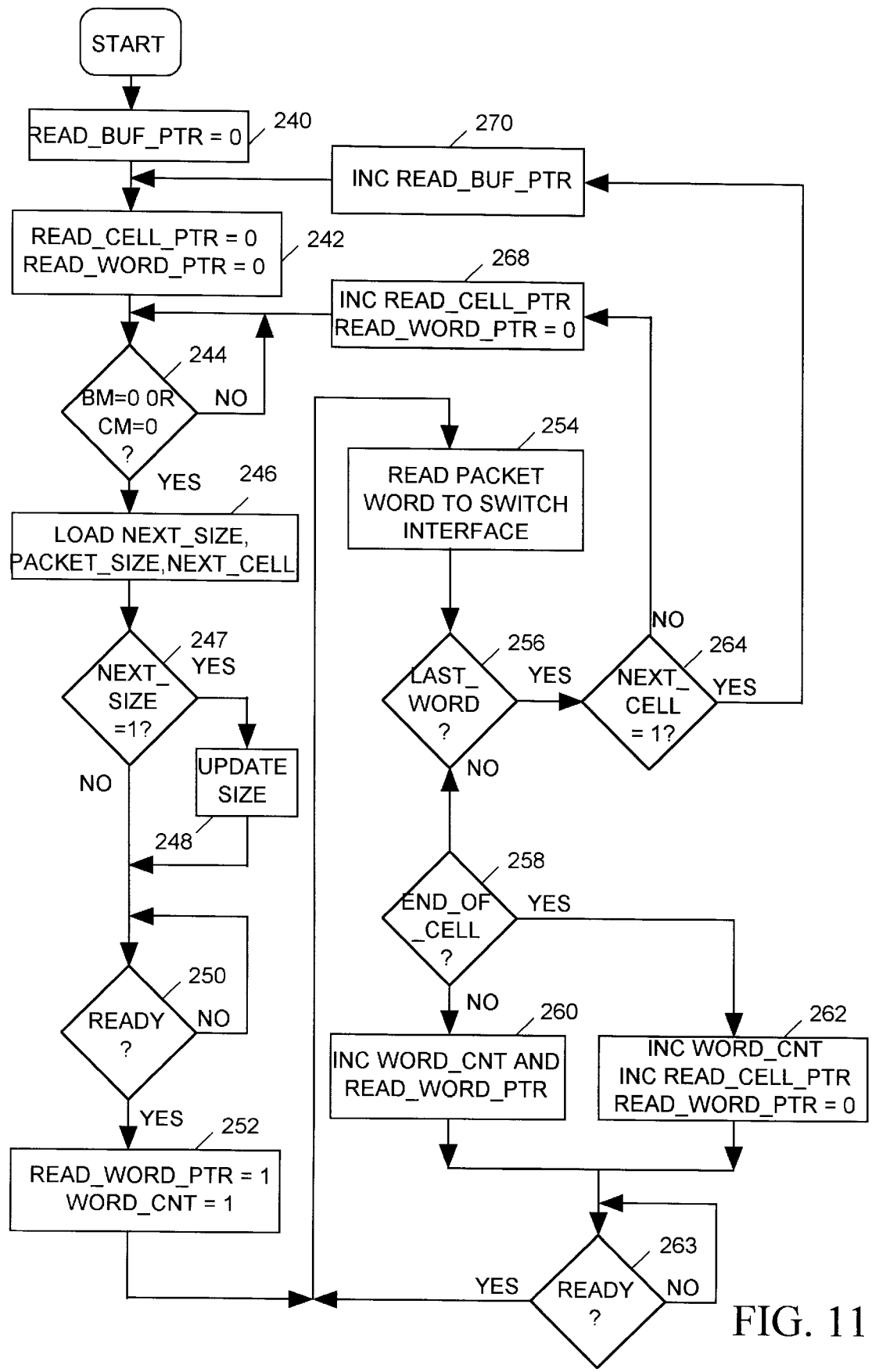
FIG. 11 is a flow chart illustrating operation of the state machine of FIG. 10.

FIG. 11 illustrates operation of state machine 220 of transmit module 22 of FIG. 10. Referring to FIG. 11, state machine 220 signals counter 30 on system start up to set its READ_BUF_PTR output to 0 (step 240), and signals counters 31 and 222 to set their READ_CELL_PTR and READ_WORD_PTR outputs to 0 (set 242). Thus the first storage location of cell C0 of packet buffer PB0 is read addressed. State machine 220 then waits until either an output bit BM produced by a comparator 34 of FIG. 2 or an output bit CM produced by comparator 35 of FIG. 2 is a logical "0." Comparator 34 compares WRITE_BUF_PTR to READ_BUF_PTR and sets its output BM bit to a logical "1" when the two pointer match. When the BM bit is a "1," receive module 20 is still writing packet data to the same packet buffer that transmit module 22 wants to read access next. When the CM bit is a "1," receive module 20 is still writing packet data to the same packet cell that transmit module 22 wants to read access next. Thus transmit module 22 waits at step 244 until either the BM or CM bit is a logical "0." This indicates that receive module 20 has finished writing packet data to the packet cell transmit module 22 wants to write access and that the transmit module 22 may now access that cell.

State machine 220 next (step 246) loads the NEXT_SIZE, PACKET SIZE, and NEXT_CELL data into register 226. It does this by pulsing a READ output signal causing memory arbitrator 24 to read the NEXT_SIZE, NEXT_CELL and PACKET_SIZE data for the packet stored in cell C0 of packet buffer PB0 and by pulsing a control signal S11 causing the read out data to be loaded into register 226. If the NEXT_SIZE bit is set to a 1 (step 247), then state machine updates the cell size by pulsing an UPDATE_SIZE signal pulse to a shift-out (SO) control input of FIFO buffer 231. FIFO buffer 231 responds by shifting out a next READ_CELL_SIZE value to comparator 233 and address formatter 230.

State machine 220 then waits (step 250) for a READY signal from bus interface 228 indicating that it is ready to receive a next data word. On detecting the READY signal, state machine 220 signals counter 222 to set the READ_WORD_PTR equal to 1 and signals a counter 224 to set WORD_CNT to 1 (step 252). State machine 220 then (step 254) pulses the READ signal causing memory arbitrator 24 (FIG. 2) to read first word of the packet stored in cells C0 of packet buffer PB0. State machine 220 also asserts an S12 signal input to bus interface circuit 228 a step 254. Interface circuit 228 responds to the S12 signal by acquiring the packet data word read out of buffer memory 18 and forwarding it outward in serial form via bus 14.

If the LAST_WORD output of comparator 232 indicates the packet word read out at step 254 is not the last word of a packet (step 256), and if the END_OF_CELL output of comparator 233 indicates the packet word was not the last word stored in a cell (step 258), then state machine 220 signals counter 224 via signal S14 to increment its WORD_CNT output and signals counter 222 via signal S13 to increment its READ_WORD_PTR output (step 260). State machine 220 then returns to step 254 where it reads the next packet data out of buffer memory 18. State machine 220 repeats steps 254–260 until either the last word of the packet is detected at step 256 or until the last word of a cell is detected at step 258. In the later case, state machine 220 (at step 262) signals counter 224 to increment WORD_CNT, signals counter 31 to increment the READ_CELL_PTR, and signals counter 222 to set READ_WORD_PTR to 0. Thereafter (step 254) state machine 220 begins sequentially reading packet data words out of the next memory cell and sending them to switch interface 228. When at step 256, state machine 220 detects that it has read out the last word of a packet, it checks (at step 264) the NEXT_CELL bit stored in register 226 to determine whether the next packet is stored in the next cell of the same packet buffer (NEXT_CELL=0) or is stored beginning in the first cell of the next packet buffer (NEXT_CELL=1). If NEXT_CELL is a logical "0", state machine 220 signals counter 31 (FIG. 2) to increment READ_CELL_PTR and signals counter 222 to set READ_WORD_PTR to 0 (step 268). State machine 220 then returns to step 244 to begin processing the packet stored in the next packet cell. If at step 264 the NEXT_CELL bit is set to a logical "1", state machine 220 signals counter 30 to increment READ_BUF_PTR (step 270) and returns to step 242 to begin processing the packet stored in the next packet buffer, when it is available.

Thus has been shown and described a network packet which groups storage locations a set of uniform-sized packet buffers and subdivides each packet buffer into a set of uniform-sized packet cells. Each packet cell is sized to hold a small packet (at least as large as the minimum size packet that can be transmitted on the network). Each packet buffer is sized to store the maximum sized packet that can be transmitted on the network. The buffer manager stores successively received small packets in successive packet cells of the same packet buffer but reserves an entire packet buffer for each large packet. The size of each packet cell, and therefore the number of packet cells into which each packet buffer, is controlled by externally generated configuration data and can be changed on-the-fly during packet buffer operation. A network manager can adjust the packet cell size to optimize the efficiency of buffer memory use. For example when most packets transmitted through the packet buffer are of minimum size, the buffer manager can size packet cells to store packets of that minimum size, thereby enabling each packet buffer to store a maximum number of small packets. On the other hand, when most packet cells are, for example 1.5 to 2 times larger than minimum size, a network manager may size packet cells to store packet cells that are twice the minimum size, thereby to increase the number of packets that can be stored in a single packet cell.

While the forgoing specification has described preferred embodiment(s) of the present invention, one skilled in the art may make many modifications to the preferred embodiment without departing from the invention in its broader aspects. For example, while in the example illustrated herein the minimum and maximum size packets were 31 and 1023 16-bit data words, respectively, those skilled in the art will appreciate that the present invention can be easily adapted to organize the buffer memory to handle other combinations of minimum and maximum packet size. The appended claims therefore are intended to cover all such modifications as fall within the true scope and spirit of the invention.

What is claimed is:

1. A method of operation for a network buffer which receives incoming data packets of variable size arriving on an input bus, stores each incoming packet in a memory, and thereafter reads each stored packet out of the memory and forwards it on an output bus, wherein each incoming data packet is no greater than a particular maximum size, wherein the memory comprises a set of packet buffers, each of size large enough to store a maximum size data packet, each packet buffer being subdivided into a plurality of packet cells of uniform size too small to store a maximum size data packet, the method comprising the steps of:

determining a size of each incoming data packet, storing each incoming data packet in a plurality of cells of an unoccupied packet buffer if the incoming data packet is too large to be stored in a single one of said packet cells; and storing each incoming data packet in a single unoccupied packet cell when the incoming data packet is small enough to be stored in a single packet cell, wherein a packet buffer is occupied when at least one of its packet cells stores packet data and wherein a packet cell is occupied when it stores packet data.

2. The method in accordance with claim 1 further comprising the step of altering said uniform size of packet cells of at least one packet buffer in response to input configuration data.

3. A network buffer for receiving data packets on an input bus, storing the data packets, and thereafter forwarding the data packets on an output bus, wherein said data packets vary in size between a maximum size and a minimum size, the network buffer comprising:

a buffer memory for storing the data packets; and a buffer manager for receiving the data packets arriving on said input bus and writing them into said buffer memory, wherein said buffer memory includes a set of packet buffers, each of which is large enough to store said maximum size data packet, wherein each packet buffer is subdivided into a plurality of packet cells, each of which is large enough to store a data packet of said minimum size but too small to store a data packet of said maximum size, wherein received data packet that is too large to be stored in a single packet cell is stored by itself in a plurality of packet cells of an unoccupied packet buffer, wherein each packet that is small enough to be stored in a single packet cell is stored by itself in an unoccupied packet cell, wherein a packet buffer is unoccupied when it stores no data packet and wherein a packet cell is unoccupied when it stores no packet data.

4. The network buffer in accordance with claim 3 wherein said buffer manager also reads data packets out of said buffer memory and forwards them on said output bus.

5. The network buffer in accordance with claim 3 wherein each packet buffer is subdivided into a plurality of packet cells of uniform-size.

6. The network buffer in accordance with claim 5 wherein said buffer manager includes means for altering the uniform size of packet cells in response to input configuration data.

7. The network buffer in accordance with claim 3 wherein the buffer manager writes a plurality of successively received incoming data packets, each small enough to be stored in a single packet cell, into separate unoccupied packet cells of a common packet buffer.

8. A dynamically configurable buffer, the buffer comprising:

a buffer memory; and a buffer manager for receiving data packets of various sizes, for organizing the buffer memory into a set of uniform sized packet buffers, for further organizing each packet buffer into a plurality of smaller packet cells of uniform size, for determining a size of each received data packet, for storing each received data packet in multiple packet cells of an unoccupied packet buffer when the received data packet is too large to be stored in a single packet cell, and for storing each received data packet in an unoccupied packet cell when the received data packet is small enough to be stored in a single packet cell.

9. The dynamically configurable buffer in accordance with claim 8 wherein the buffer manager alters said uniform size of said packet cells in response to input configuration data.

\* \* \* \* \*